(12) United States Patent
Patel et al.

(10) Patent No.: US 7,312,915 B2
(45) Date of Patent: Dec. 25, 2007

(54) MICROELECTROMECHANICAL DEVICES WITH LOW INERTIA MOVABLE ELEMENTS

(75) Inventors: Satyadev Patel, Palo Alto, CA (US); Jianglong Zhang, Sunnyvale, CA (US)

(73) Assignee: Texas Instruments Incorporated, Dallas, TX (US)

( * ) Notice: Subject to any disclaimer, the term of this patent is extended or adjusted under 35 U.S.C. 154(b) by 200 days.

(21) Appl. No.: 11/135,230

(22) Filed: May 23, 2005

(65) Prior Publication Data

US 2006/0262382 A1 Nov. 23, 2006

(51) Int. Cl.
*G02B 26/00* (2006.01)
*G02B 26/08* (2006.01)

(52) U.S. Cl. .................................. 359/291; 359/225

(58) Field of Classification Search ........ 359/290–292, 359/223, 224, 295, 198, 225, 298, 316
See application file for complete search history.

(56) References Cited

U.S. PATENT DOCUMENTS

| 7,220,009 | B2 * | 5/2007 | Shimada et al. ............ 359/849 |
| 2004/0125347 | A1 * | 7/2004 | Patel et al. .................... 353/98 |
| 2006/0220199 | A1 * | 10/2006 | Duboc et al. ................ 257/678 |

* cited by examiner

*Primary Examiner*—Ricky Mack
*Assistant Examiner*—William C Choi
(74) *Attorney, Agent, or Firm*—Wade James Brady, III; Frederick J. Telecky, Jr.

(57) ABSTRACT

A microelectromechanical device having a movable element with low mass inertia is disclosed herein. The movable element is held on a substrate such that the element is capable of rotating relative to the substrate; and the element has a mass inertia of $1.2 \times 10^{-24}$ kg·m² or less.

76 Claims, 8 Drawing Sheets

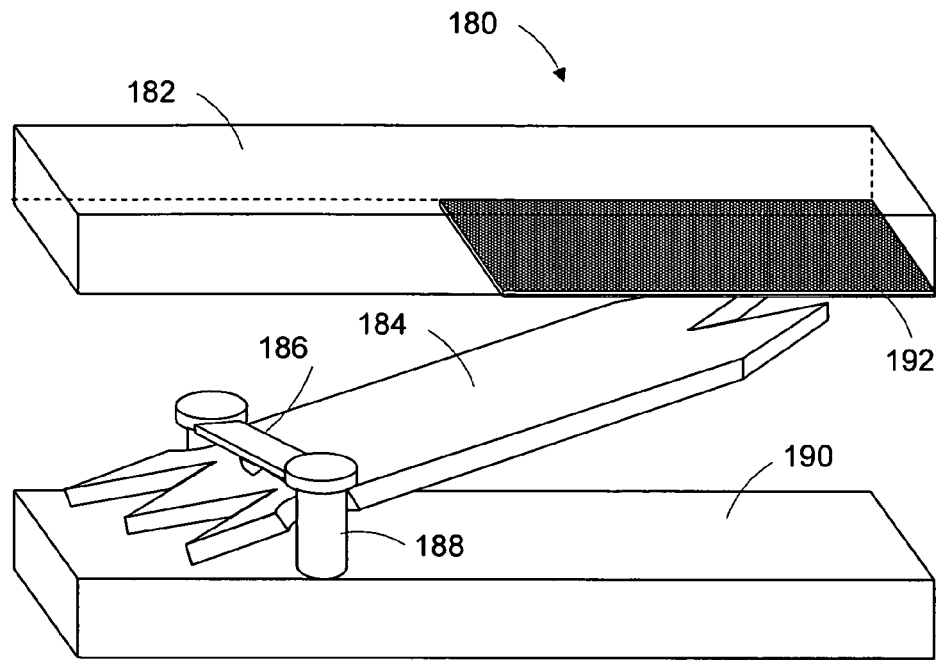
FIG. 6
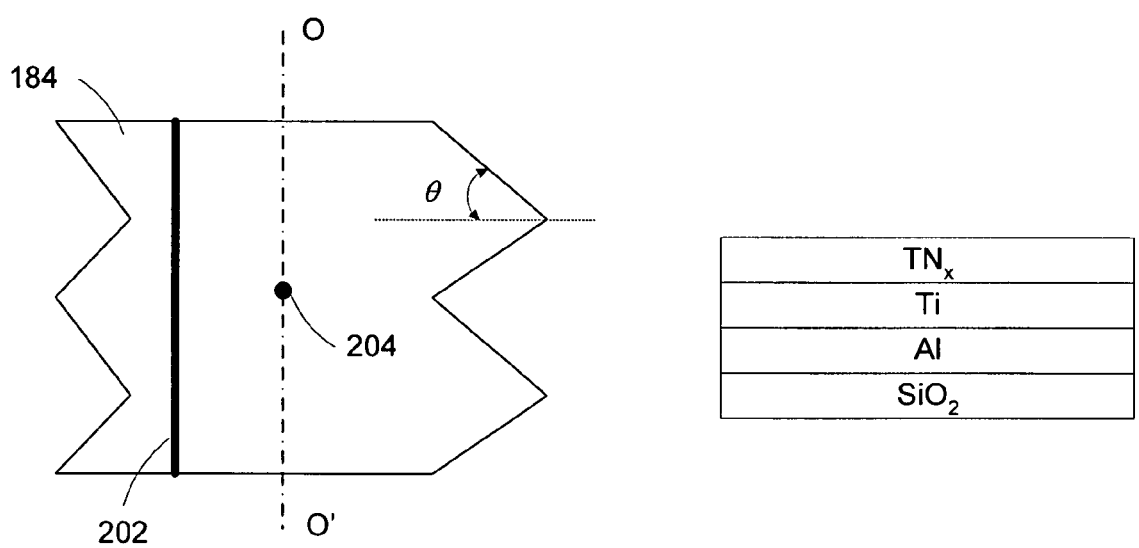
FIG. 7a
FIG. 7b

MICROELECTROMECHANICAL DEVICES WITH LOW INERTIA MOVABLE ELEMENTS

TECHNICAL FIELD OF THE INVENTION

The present invention is related generally to the art of microelectromechanical devices with movable elements, and more particularly to spatial light modulators having micromirror devices with deflectable mirror plates of low inertia.

BACKGROUND OF THE INVENTION

Microelectromechanical devices, such as microstructures with movable elements (e.g. micromirror devices), have found many applications in basic signal transduction. For example, a spatial light modulator based on micromirror devices steers light in response to electrical or optical signals by deflecting the deflectable reflective mirror plates into different spatial directions. Such a spatial light modulator can be a part of a communication device or an information display.

A major factor that limits the reliability and widespread use of micromirror devices is adhesion. Adhesion is a result of the dominance of surface and interfacial forces, such as capillary, chemical bonding, electrostatic, and van der Waals forces, over mechanical forces which tend to separate micromirror device components. When mechanical restoring forces cannot overcome adhesive forces, the micromirror devices are said to suffer from stiction. Stiction failures in contacting micromirror devices, can occur after the first contacting event (often referred to as initial stiction), or as a result of repeated contacting events (often referred to as in-use stiction). Initial stiction is often associated with surface contamination (e.g., residues of bonding materials or photoresist), or with high energy of contacting surfaces (e.g., clean oxidized silicon or metallic surfaces). For the case of in-use stiction, each time one part of the micromirror (e.g. mirror plate of a micromirror device) touches the other (e.g. stopping mechanism) or the substrate, the contact force grows and ultimately becomes too large for the restoring force to overcome. In this case, the device remains in one state indefinitely. This phenomenon can arise from a variety of underlying mechanisms, such as contact area growth, creation of high-energy surface by micro-wear, surface charge separation etc.

The stiction of the micromirrors often exhibits dynamic characters. For example, the stiction in a micromirror can vary over time, and the restoration force necessary to overcome the stiction in the same micromirror may also vary over time. In a micromirror array device, such as a micromirror-based spatial light modulator, the stiction may occur in different micromirrors at different times in operation. Such stiction in individual micromirrors may also vary over time.

Another factor that may limit the usage of microelectromechanical devices with movable elements is the response delay or slow response of the external driving signals. For example, a micromirror device operates by deflecting the deflectable reflective mirror plate in response to the external electrostatic force. If the response time of the mirror plate to the external electrostatic force is too long, or the movements of the mirror plate is not instantaneous with changes of the external electrostatic force, the operation of the micromirror fails.

Therefore, what is needed is a micromechanical device with reliable and robust movable element.

SUMMARY OF THE INVENTION

In view of the foregoing, the present invention provides a microelectromechanical device having a movable element of low inertia as compared with those in the movable elements of the micromechanical devices in prior art. The movable element of low inertia can be made by thinning the thickness, and/or made of materials of low density. Alternatively, the movable element can be geometrically configured in the microelectromechanical device such that the rotation axis of the movable element is as close to the mass center of the mirror plate as possible with other parameters given.

With such movable element of low inertia, the response of the movable element to the external driving signals can be improved. In the presence of stopping mechanism, favorable soft landing can be achieved, which in turn reduces the possibility of in-site stiction of the movable element. When the movable element is supported by a post, the damping effect, which unavoidably appears in the microelectromechanical devices, can be significantly depressed.

In an embodiment of the invention, a microelectromechanical device is disclosed. The device comprises: deflectable element held on a substrate such that the element is capable of rotating relative to the substrate, wherein the element has a mass inertia of $22.44 \times 10^{-24}$ kg·m$^2$ or less.

The objects of the invention are achieved in the features of the independent claims attached hereto. Preferred embodiments are characterized in the dependent claims.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

FIG. 6 is a perspective view of an exemplary micromirror device useable in the spatial light modulator of FIG. 1;

FIG. 7a schematically illustrates a top view of the deflectable mirror plate of the micromirror device of FIG. 6;

FIG. 7b illustrates a cross-sectional view of an exemplary multi-layered mirror plate;

DETAILED DESCRIPTION OF THE EMBODIMENTS

In view of the forgoing, the present invention provides a micromechanical device with a movable element of low inertia as compared with those in the movable elements of the micromechanical devices in prior art. The movable element of low inertia can be made by thinning the thickness, and/or made of materials of low density. Alternatively, the movable element can be geometrically configured in the microelectromechanical device such that the rotation axis of the movable element is as close to the mass center of the mirror plate as possible with other parameters given.

With such movable element of low inertia, the response of the movable element to the external driving signals can be improved. In the presence of stopping mechanism, favorable soft landing can be achieved, which in turn reduces the possibility of in-site stiction of the movable element. When the movable element is supported by a post, the damping effect, which unavoidably appears in the microelectromechanical devices, can be significantly depressed.

In the following, the present invention will be discussed in detail with reference to micromirrors each having a reflective deflectable mirror plate. It will be immediately appreciated by those skilled in the art that the following discussion is for demonstration purposes only, and will not be interpreted as a limitation. Rather, many other variations without departing from the spirit of the invention are also applicable. For example, the present invention is applicable to many other micromechanical device having movable elements, such as optical switch, micro-engine, or the like.

Figure 1:
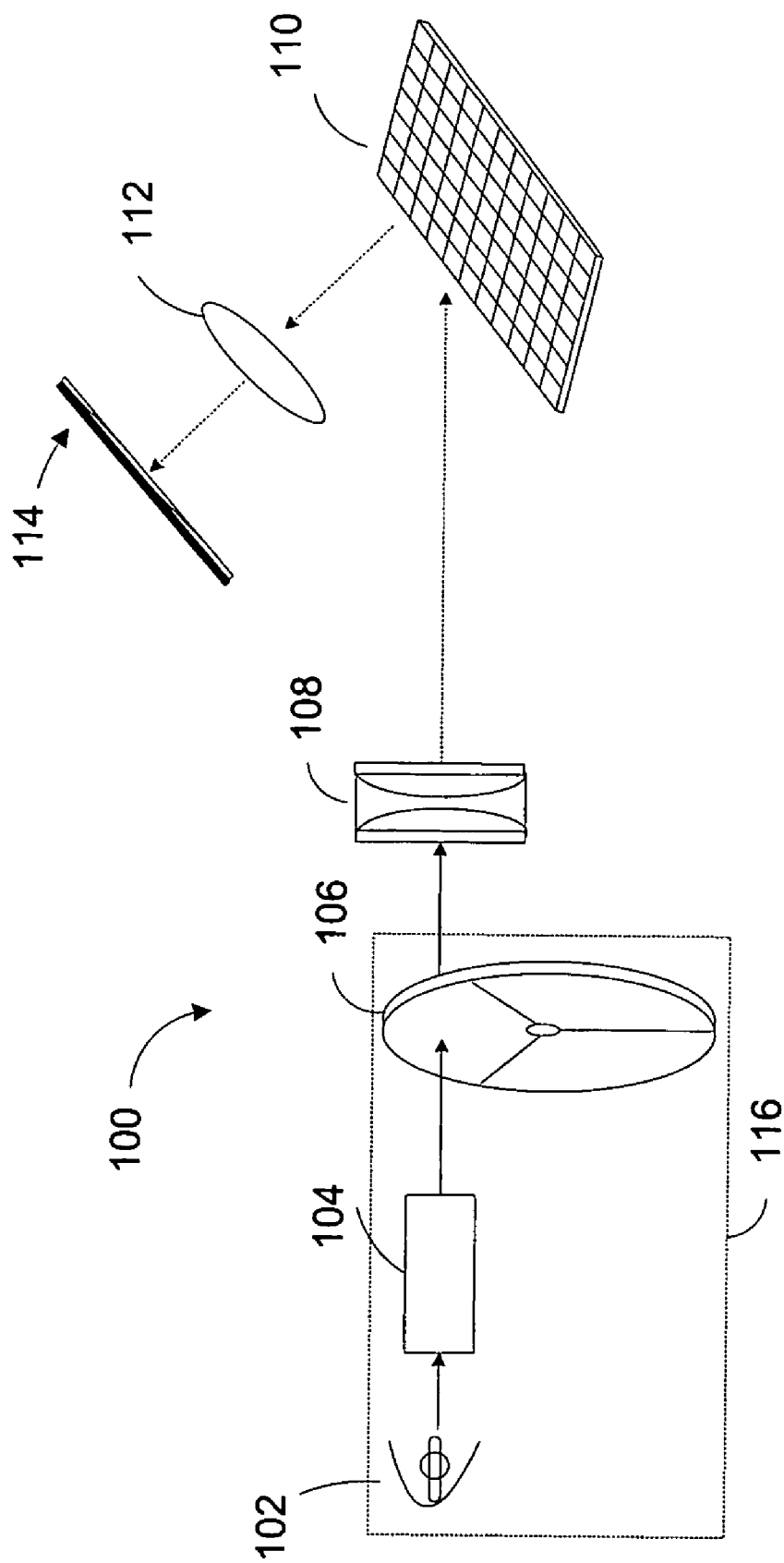
FIG. 1 illustrates an exemplary display system employing a spatial light modulator having an array of micromirrors in which embodiments of the invention can be implemented.

Micromirrors with deflectable and reflective mirror plates have been pervasively used in signal processing, such as in digital display systems. An exemplary digital display system employing a spatial light modulating having an array of micromirrors is illustrated in FIG. 1. Referring to FIG. 1, display system 100 comprises illumination system 116 for producing sequential color light, spatial light modulator 110 that comprises an array of micromirrors, optical element 108 for directing illumination light from the illumination system onto the spatial light modulator, and optical element 112 that projects the reflected illumination light onto display target 114.

Illumination system 116 further comprises light source 102, which can be an arc lamp, lightpipe 104 that can be any suitable integrator of light or light beam shape changer, and color filter 106, which can be a color wheel. The filter in this particular example is positioned after light pipe 104 at the propagation path of the illumination light. In another example, the color filter can be positioned between the light source and light pipe 104, which is not shown in the figure.

The present invention is also applicable to other micromirror based display systems, such as a display system employing more than one spatial light modulator of micromirrors. For example, a display system may employ three separate micromirror based spatial light modulators with each being designated for modulating a primary color. The modulated primary colors are then combined together to produce full color image or video, which will not be discussed in detail herein.

Figure 2:
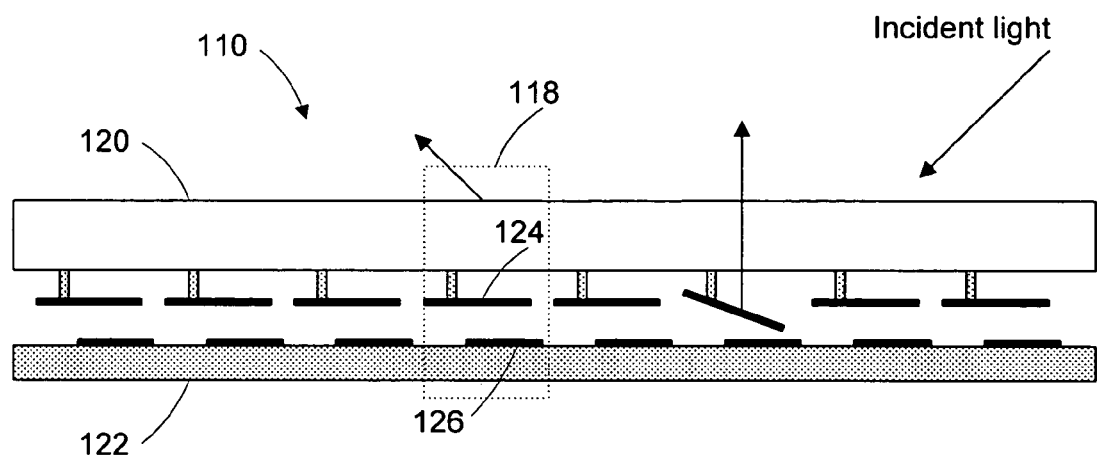
FIG. 2 illustrates a cross-section of a portion of the spatial light modulator in FIG. 1.

FIG. 2 illustrates a cross-section view of an exemplary spatial light modulator in FIG. 1. For simplicity purposes, only eight micromirror devices are illustrated therein. In general, the micromirror array of a spatial light modulator consists of thousands or millions of micromirrors, the total number of which determines the resolution of the displayed images. For example, the micromirror array of the spatial light modulator may have 1024×768, 1280×720, 1400× 1050, 1600×1200, 1920×1080, or even larger number of micromirrors. In other applications, the micromirror array may have less number of micromirrors.

In this example, the array of deflectable reflective mirror plates (e.g. 124) is disposed between light transmissive substrate 120 and semiconductor substrate 122 having formed thereon an array of addressing electrodes (e.g. addressing electrode 126) each of which is associated with a mirror plate for electrostatically deflecting the mirror plate. In operation, the illumination light passes through the light transmissive substrate and illuminates the reflective surfaces of the mirror plates, from which the illumination light is modulated. The reflected illumination light from the mirror plates at the ON state is collected by the projection lens (e.g. projection lens 112 in FIG. 1) so as to generate a "bright" pixel in the display target (e.g. display target 114 in FIG. 1). The reflected illumination from the mirror plates at the OFF state travels away from the projection lens, resulting in the corresponding pixels in the display target to be "dark."

In an alternative configuration, the deflectable reflective mirror plates can be formed on the semiconductor substrate having the addressing electrode, in which instance, the light transmissive substrate may not be provided, which is not shown in the figure.

In yet another embodiment, the deflectable reflective mirror plates can be derived from a single crystal, such as single crystal silicon, as set forth in U.S. patent applications Ser. No. 11/056,732, Ser. Nos. 11/056,752, and 11/056,752, all filed Feb. 11, 2005, the subject matter of each being incorporated herein by reference.

The micromirrors in the array can be arranged in many suitable ways. For example, the micromirrors can be arranged such that the center-to-center distance between the adjacent mirror plates can be 10.16 microns or less, such as 4.38 to 10.16 microns. The nearest distance between the edges of the mirror plate can be from 0.1 to 1.5 microns, such as from 0.15 to 0.45 micron, as set forth in U.S. patent applications Ser. No. 10/627,302, Ser. No. 10/627,155, and Ser. No. 10/627,303, both to Patel, filed Jul. 24, 2003, the subject matter of each being incorporated herein by reference.

Figure 3:
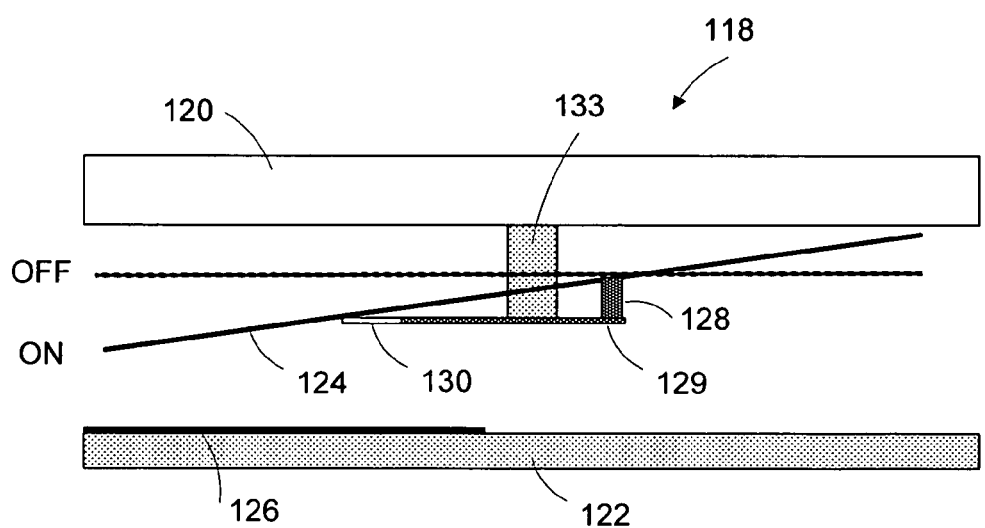
FIG. 3 illustrates an exploded cross-section view of a micromirror device in FIG. 2.

As a way of example, an exemplary micromirror in FIG. 2 is schematically illustrated in a cross-section view in FIG. 3. Referring to FIG. 3, micromirror 118 comprises deflectable mirror plate 124 having a reflective surface for reflecting the illumination light to be modulated. The mirror plate is attached to deformable hinge 129 (e.g. a torsion hinge) via hinge contact 128 with the deformable hinge being held and supported by post 133 on substrate 120 such that the mirror plate can be deflected (rotated) relative to the substrate. The deflection of the mirror plate is achieved by electrostatic field established between the mirror plate and addressing electrode 126. In accordance with an embodiment of the invention, only one addressing electrode is provided for the micromirror. Alternatively, multiple addressing electrodes can be provided for each micromirror. When multiple electrodes are provided, one of the multiple electrodes can be an addressing electrode positioned as addressing electrode 126 in the figure, while the other electrodes can be configured in many ways as desired. For example, another one of the multiple electrodes can be positioned at a location opposite to addressing electrode 126 in relation to post 133. Alternatively, another one of the multiple electrodes can be positioned at the lower surface of the light transmissive substrate 120, in which instance, such electrode is preferably transparent to the incident light, as set forth in U.S. patent application Ser. No. 10/437,776 filed May 13, 2003, and Ser. No. 10/947,005 filed Sep. 21, 2004, the subject matter of each being incorporated herein by reference in entirety.

Stopper 130 can be provided as an alternative feature to limit the rotation of the mirror plate in accordance with the operation states, such as the ON state when the micromirror is operated in a binary mode including the ON and OFF state. The stopper 130 can be formed in many alternative ways, such as those set forth in U.S. patent applications Ser. No. 10/437,776 filed Apr. 13, 2003 and Ser. No. 10/613,379 filed Jul. 3, 2003, Ser. No. 10/703,678 filed Nov. 7, 2003, the subject matter of each being incorporated herein by reference.

In operation, the mirror plate rotates towards the ON state position with the electrostatic field established between the mirror plate and addressing electrode. The rotation of the mirror plate is stopped by the stopper when the mirror plate arrives at the ON state angle, in which situation the mirror plate abuts against the stopper. During the rotation of the mirror plate to the ON state angle, the hinge is deformed, and restoration energy due to such deformation is stored in the hinge. When the OFF state is desired, the voltages of the mirror plate and the addressing electrode are reduced such that the resulted electrostatic field cannot balance the restoration energy stored in the deformable hinge. Therefore, the mirror plate departs from the ON position and returns to the OFF state.

According to the invention, the deflectable reflective mirror plate of the micromirror is configured to have low inertia such that the mirror plate is enabled to respond to the change of the external electrostatic forces instantaneously, wherein the change of the external electrostatic force is sufficient to rotate the mirror plate. In another word, the movement of the mirror plate is in phase to the change of the external electrostatic force, which is sufficient to move the mirror plate. The mirror plate of low inertia has many other advantages. For example, low inertia allows the mirror plate to perform soft landing to the stopper, in which case in-site stiction can be significantly depressed, as set forth in U.S. patent application Ser. No. 10/944,379 filed Sep. 14, 2004, wherein a stop retarding mechanism is provided for achieving the same purpose, the subject matter of which is incorporated herein by reference. For another example, a mirror plate with low inertia may depress the damping impact of the micromirrors.

Figure 4:
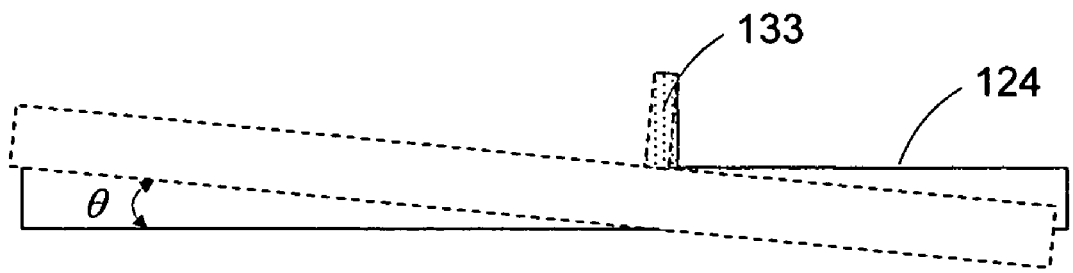
FIG. 4 illustrates the effect of mirror plate damping.

The damping effect is illustrated in FIG. 4. Referring to FIG. 4, an exploded view of mirror plate 124 held by hinge contact 133 in FIG. 3 is illustrated therein. In operation, the mirror plate switches frequently between the ON and OFF state, causing the deformable hinge and hinge contact deforming frequently. After a period of operations, the mirror plate may be mechanically damped—that is, the mirror plate is unable to return to its original OFF state (e.g. a state wherein the mirror plate is parallel to the substrate). Instead, the damped mirror plate at the OFF state presents angle θ to the mirror plate at the OFF state before damping. This fatigue associated mechanical damping occurs avoidably. To depress such mechanical damping, mirror plate of low inertia is advantageous.

Another advantage to have a reflective deflectable mirror plate with low inertia is to reduce the possibility of in-site stiction. In-site stiction occurs when the mirror plate is not be able to depart from the ON state when the restoration force can not overcome the surface force between the contact surfaces of the mirror plate and the stopper, even though the electrostatic field between the mirror plate and the addressing electrode is reduced to zero. Mirror plates with low inertia are able to perform soft landing on the stopping mechanism—meaning that the rotational momentum of the mirror plates with low inertia is not bounced back when impinging the stopping mechanism, or the reversed velocity of the bounced mirror plate back from the stopping mechanism is much less than the velocity of the mirror plate approaching the stopping mechanism. For example, the departure speed of the mirror plate from the stopping mechanism is 5% or less, or 1% or less of the speed of the mirror plate approaching the stopping mechanism. Therefore, change of the rotation momentum of the mirror plate before and after contacting the stopping mechanism can be small, which in turn benefits the reduction of the in-site stiction possibility.

In addition to make the mirror plate of low inertia, other techniques can be used in combination with the current invention, especially for depressing the in-site stiction. For example, a reparation process comprising refresh voltage pulses are performed with the voltage pulses being applied to the mirror plate so as to produce additional restoration energy. Specifically, refresh voltage pulses force the mirror plate to move towards the addressing electrode and thus, producing additional deformation in the deformable hinge. The additional deformation results in additional mechanical restoration energy that is added to and thus, enhancing the stored restoration energy in the hinge, as set forth in U.S. patent application title: "A METHOD OF REPAIRING MICROMIRRORS IN SPATIAL LIGHT MODULATORS", attorney docket number P203-US, filed Feb. 28, 2005, the subject matter being incorporated herein by reference in entirety.

Inertia measures the tendency of resisting changes in the state of motion for a given solid body. In the instance of rotation motion of mirror plates in micromirrors, inertia can be expressed as:

$$I = \int \rho(R) r^2 dV \qquad \text{(Equation 1)}$$

wherein $\rho(R)$ is the density of at position R, and r is the perpendicular distance from position R to the axis of rotation, and the integration is performed in 3-Dimention.

The angular momentum of the mirror plate during rotation can be expressed as:

$$L_{angular} = I \times \omega \qquad \text{(Equation 2)}$$

wherein $L_{angular}$ is the angular momentum; I is the rotation inertia of the mirror plate; and $\omega$ is the angular velocity of the mirror plate in rotation. It can be seen from equation 2 that for the given angular velocity $\omega$, angular momentum depends only on the rotation inertia I. Therefore, reducing the rotation inertia reduces the angular momentum, which benefits the depression of abrupt change of the velocity of the mirror plate when impinging the stopping mechanism; and in turn depressing the possibility of in-site stiction.

The rotation inertia also affects the response speed of the mirror plate to the external driving force, such as electrostatic force. Such response can be characterized by the intrinsic resonant frequency of the mirror plate, which can be expressed as:

$$f = \frac{1}{2\pi}\sqrt{\frac{K}{I}} \qquad \text{(Equation 3)}$$

wherein f is the intrinsic resonant frequency of the mirror plate, K is the spring constant of the mirror plate; and I is the rotation inertia. The spring constant K is determined by the mechanical properties of the deformable hinge to which the mirror plate is attached. Specifically, the spring constant K can be expressed as:

$$K = K_0 \frac{\gamma \cdot w \cdot t^3}{l} \qquad \text{(Equation 4)}$$

wherein $K_0$ is a constant; $\gamma$ is the shear modulus of the hinge; w is the width of the hinge; t is the thickness of the hinge; and l is the length of the hinge. It can be seen from equations 3 and 4 that the intrinsic resonant frequency f depends upon the reciprocal of inertia I squared. Reduced inertia I clearly yields reduction of the intrinsic resonant frequency f, which in turn, resulting in the increase of the response speed of the mirror plate to the external driving force.

Figure 5:
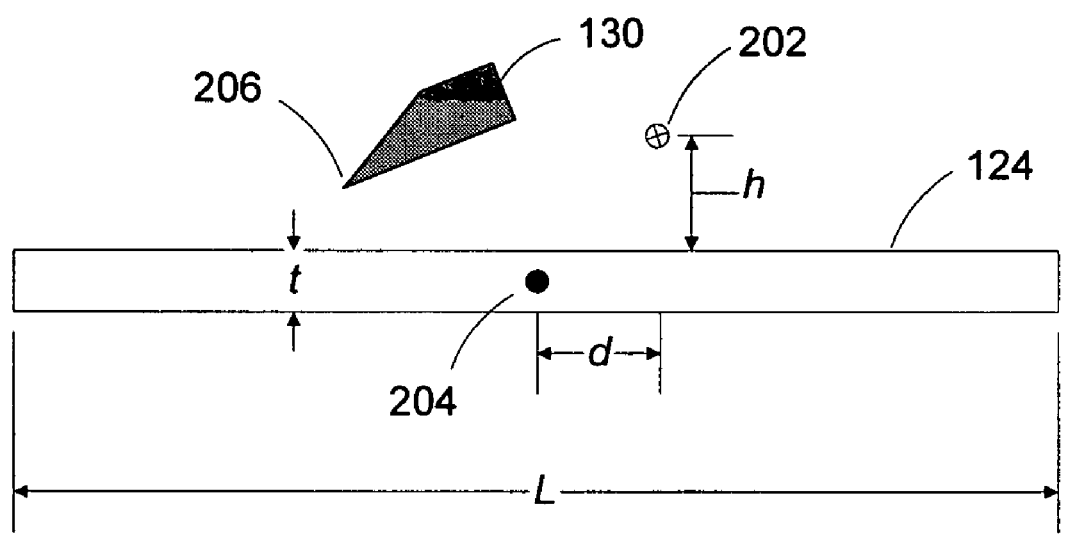
FIG. 5 illustrates an exploded cross-section view of the mirror plate in FIG. 3

Reduced rotation inertia can be achieved, as seen in equation 1, by using the materials of low density ρ, or reducing the vertical distance r between the rotation axis and the mass center of the mirror plate, or reducing the geometric dimensions, such as the thickness t and surface area of the mirror plate, or any combinations thereof, as shown in FIG. 5. However, reducing the surface area of the mirror plate reduces the reflective efficiency of the incident light. Therefore, reducing the surface area only for the purpose of reducing the rotation inertia of the mirror plate is less preferred.

According to the invention, the rotation of inertia I of the deflectable reflective mirror plate is $8 \times 10^{-24}$ kg·m² or less, such as $7.38 \times 10^{-24}$ kg·m² or less, $5.93 \times 10^{-24}$ kg·m² or less, $4.09 \times 10^{-24}$ kg·m² or less, $2 \times 10^{-24}$ kg·m² or less, $1.25 \times 10^{-24}$ kg·m² or less, $1.1 \times 10^{-24}$ kg·m² or less, $0.9 \times 10^{-24}$ kg·m² or less, and $0.77 \times 10^{-24}$ kg·m² or les, or from $0.2 \times 10^{-24}$ kg·m² to $8 \times 10^{-24}$ kg·m². The pitch (center-to-center distance between adjacent mirror plates) of the micromirror array is preferably from 4.38 to 18 microns, such as from 6 to 18 microns, and more preferably from 4.38 to 10.16 micrometers. The ratio of the inertia to pitch can be from $0.01 \times 10^{-18}$ kg·m to $0.12 \times 10^{-18}$ kg·m, such as from $0.03 \times 10^{-18}$ kg·m to $0.08 \times 10^{-18}$ kg·m. In another embodiment, the inertia to pitch ratio can be made higher by reducing the pitch size but still using mirror plates of small mass inertia, such as from $0.167 \times 10^{-18}$ kg·m to $0.7 \times 10^{-18}$ kg·m, or from $0.2 \times 10^{-18}$ kg m to $0.5 \times 10^{-18}$ kg·m, or around $0.45 \times 10^{-18}$ kg·m.

The intrinsic resonant frequency of the mirror plate is 50 KHz or higher, such as 86.72 KHz or higher, 103.12 KHz or higher, or 150 KHz or higher. The time interval for the mirror plate rotating from the natural resting state to the ON state is preferably 20 μs or less, such as 17 μs or less, or 16 μs or less, or 15 μs or less, or 12.85 μs or less. The time interval for the mirror plate rotating from the natural resting state to the OFF state is preferably 20 μs or less, such as 15.44 μs or less, or 13.74 μs or less, or 12 μs or less. To achieve the low inertia of the mirror plate, it is preferred that the mirror plate has a total thickness of 8000 angstroms or less, such as 6000 angstroms or less, 4000 angstroms or less, and 2000 angstroms or less. The mass density of the mirror plate is preferably 3500 kg·m⁻³, such as 2200 kg·m⁻³ or less.

As a way of example, rotation inertias of two exemplary mirror plates will be calculated in the following. It will be immediately appreciated that the following discussion is for demonstration purposes only, and should not be interpreted as a limitation. In fact, the method used in determining the rotation inertia as discussed above is general for any type of rotational elements.

Referring to FIG. 5, an exploded cross-sectional view of the mirror plate in FIG. 3 is illustrated herein. For simplicity purposes, the deformable hinge to which mirror plate 124 is attached is not shown in the figure. The rotation axis 202 defined by the geometric configuration has a vertical distance h from the surface of the mirror plate. The thickness of the mirror plate is represented by t; the horizontal offset (distance) between mass center 204 of the mirror plate and rotation axis 202 is represented by d. The mirror plate has a length of L. Stopper 130 defines the rotation limit (e.g. the ON state angle) of the mirror plate in one rotation direction. At the rotation limit (e.g. the ON state), the surface of the mirror plate contacts contacting point 206 of the mirror plate; and the rotation of the mirror plate is stopped.

The mirror plate may have different shapes, one of which is illustrated in FIG. 7a. An exemplary micromirror having such mirror plate is illustrated in FIG. 6, which will be discussed afterwards. Referring to FIG. 7a, mirror plate 184 comprises symmetrical axis OO' that passing through mass center 204 and parallel to rotation axis 202 that is offset from the symmetrical axis OO'. Such offset configuration has many benefits. For example, it allows for the mirror plate to rotate to a larger angle than the mirror plate otherwise. Larger rotation angle benefits higher contrast ratio, which will be discussed in detail afterwards.

The rotation inertia of the mirror plate as to the rotation axis 202 can be calculated by the following equation:

$$I = I_0 + L^2 t\left(\left(h + \frac{t}{2}\right)^2 + \left(\frac{L}{\sqrt{2}} - d\right)^2\right) \qquad \text{(Equation 5)}$$

$$I_0 = \frac{1}{12} L^2 t \times (L^2 + t^2) \times \rho$$

wherein wherein L is the length of the mirror plate, t is the thickness of the mirror plate, w is the width of the mirror plate, ρ is the mass density of the mirror plate; and d is the axis offset of rotation; and h is the vertical distance between the mirror plate and deformable hinge.

The present invention is applicable to many types of micromirrors. FIG. 3 illustrates one of the many examples. Referring again to FIG. 3, the mirror plate can be attached to the deformable hinge symmetrically or asymmetrically. When the mirror plate is attached to the deformable hinge with the attachment point substantially at or around the geometric (or mass) center of the mirror plate, the mirror plate rotates symmetrically—that is, the maximum angles achievable by the mirror plate rotating in opposite directions are substantially the same. Alternatively, when the attachment point is offset from the geometric (or mass) center of the mirror plate, the mirror plate rotates asymmetrically—that is the maximum angles achievable by the mirror plate in opposite directions are different. The asymmetric rotation of the mirror plate is more advantageous in obtaining higher contrast ratio. The ON state angle of the present invention is preferably 12° degrees or more, such as 14° degrees or more, and 16° degrees or more. The OFF state can be a state where the mirror plate is parallel to the substrate on which the mirror plates are formed, such as substrate 12. The OFF state angle can be other values, such as −1° degree or less, such as −2° degrees or less, and −4° degrees or less, wherein the minus sign "−" represents the opposite rotation direction in relation to the ON state angle. Such ON and OFF state angles can be achieved by attaching the mirror plate asymmetrically to the deformable hinge. Specifically, the hinge contact (128) contacts at the mirror plate at a location away from the geometric or mass center of the mirror plate. As a result, the deformable hinge, as well as the rotation axis is not along a diagonal of a diagonal of the mirror plate when viewed from the top of the mirror plate at the non-deflected state. Exemplary micromirrors of asymmetric rotation will be better illustrated in perspective views in FIGS. 6 to 9 afterwards.

In the cross-section view of FIG. 3, the deformable hinge and the mirror plate are in different planes. Alternatively, the mirror plate and the deformable hinge can be in the same plane. For example, the mirror plate and the deformable hinge can be fabricated or derived from a single flat substrate, such as a single crystal (e.g. single crystal silicon). Alternatively, the mirror plate and the deformable hinge can be derived from one deposited film by patterning. The stopper (e.g. stopper 130) can be in the same plane of the deformable hinge, but can also be in different planes of the deformable hinge.

In addition to the addressing electrode whose operation state (voltage) depends upon the image data of the desired image, an additional electrode for rotating the mirror plate in the direction opposite to that driven by the addressing electrode can also be provided. For example, the additional electrode can be formed on substrate 120 on which the mirror plate is formed. Alternatively, the additional electrode can be formed on the micromirror on a side opposite to the addressing electrode relative to the rotation axis of the mirror plate.

In the example as shown in FIG. 3, the deflectable mirror plates are formed on substrate 120 that is transmissive to the illumination light to be modulated, such as glass and quartz when the illumination light is visible light. The addressing electrodes and circuitry are formed on substrate 122 that can be a standard semiconductor substrate. In another embodiment of the invention, the mirror plates can be directly derived from the light transmissive substrate, such as by patterning the light transmissive substrate so as to form the deflectable mirror plate. In this instance, the deformable hinge can be single crystal or deposited thin film, which will not be discussed in detail herein. As another example, the mirror plates and the addressing electrodes can be formed on the same substrate, such as semiconductor substrate 122.

Addressing electrode 126 is preferably disposed such that the edge of the addressing electrode extending beyond the mirror plate, for example, beyond the furthest point of the mirror plate measured from the deformable hinge, so as to maximize the utilization efficiency of the electrostatic field, as set forth in U.S. patent application Ser. No. 10/947,005 filed Sep. 21, 2004, the subject matter being incorporated herein by reference. In an embodiment of the invention, each mirror plate is addressed and deflected by one single addressing electrode. In this instance, the mirror plate is rotated to the ON state by an electrostatic force derived from the electrostatic field established between the mirror plate and the addressing electrode.

Referring to FIG. 6, a perspective view of an exemplary micromirror device in which embodiments of the invention are applicable is illustrated therein. Micromirror device 180 comprises substrate 190 that is a light transmissive substrate such as glass or quartz and semiconductor substrate 182. Deflectable and reflective mirror plate 184 is spaced apart and attached to deformable hinge 186 via a hinge contact. The deformable hinge is affixed to and held by posts 188. The semiconductor substrate has addressing electrode 192 for deflecting the mirror plate. In this particular example, the light transmissive substrate operates as a stopper for stopping the rotation of the mirror plate at the ON state.

A top view of the micromirror in FIG. 6 is illustrated in FIG. 7a. As can be seen in FIG. 7a, deformable hinge 186 is not along but offset from the symmetrical axis OO' of the mirror plate such that the mirror plate is operable to rotate asymmetrically. The deformable hinge is located beneath the mirror plate in the direction of the incident light. That is, the mirror plate is located between the light transmissive substrate and the deformable hinge such that the deformable hinge is not illuminated by the incident light so as to prevent unexpected light scattering from the deformable hinge, thereby, increasing the contrast ratio of the produced image. The quality of the produced image is further improved through reduction of the light scattering from the edges of the mirror plate by forming the edges of the mirror plate into zigzagged shape, as shown in the figure.

The deflectable and reflective mirror plate can be a multilayered structure. For example, the mirror plate may comprise an electrical conducting layer, a reflective layer that is capable of reflecting 85% or more, or 90% or more, or 85% or more, or 99% or more of the incident light (e.g. incident visible light), a mechanical enhancing layer that enhances the mechanical properties of the mirror plate.

As a way of example, FIG. 7b illustrates an exemplary multilayered mirror plate. Referring to FIG. 7b, the mirror plate comprises a $SiO_2$ layer, an aluminum layer, a titanium layer, and a titanium nitride layer. When the aluminum layer is to be deposited on the $SiO_2$ layer, diffusion between the aluminum layer and $SiO_x$ layer may occur. This can be avoided by depositing a barrier layer therebetween.

Figure 8:
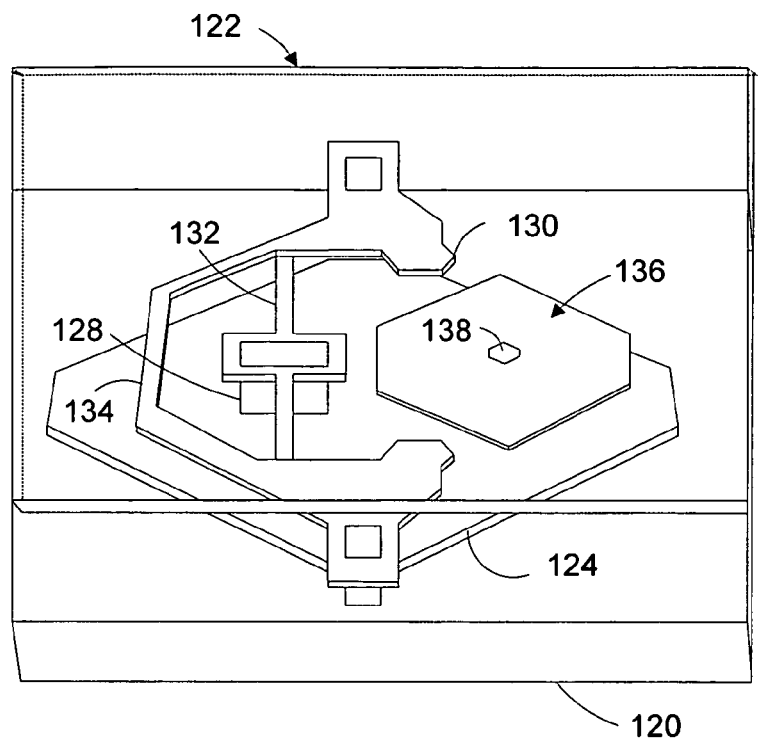
FIG. 8 is a perspective view of another exemplary micromirror device useable in the spatial light modulator of FIG. 1.

Another exemplary micromirror device having a cross-sectional view of FIG. 3 is illustrated in its perspective view in FIG. 8. Referring to FIG. 8, deflectable reflective mirror plate 124 with a substantially square shape is formed on light transmissive substrate 120, and is attached to deformable hinge 132 via hinge contact 128. The deformable hinge is held by hinge support 134, and the hinge support is affixed and held by posts on the light transmissive substrate. For electrostatically deflecting the mirror plate, an addressing electrode (not shown in the figure for simplicity purposes) is fabricated in the semiconductor substrate 122. For improving the electrical coupling of the deflectable mirror plate to the electrostatic field, extending metallic plate 136 can be formed on the mirror plate and contacted to the mirror plate via post 138.

Figure 9:
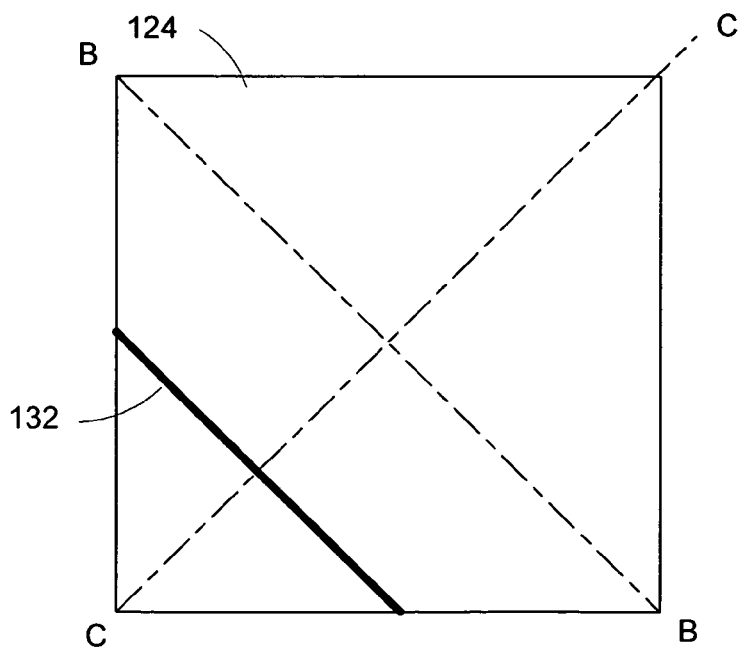
FIG. 9 schematically illustrates a top view of the deflectable mirror plate of the micromirror device of FIG. 8.

The mirror plate is preferably attached to the deformable hinge asymmetrically such that the mirror plate can be rotated asymmetrically in favor of high contrast ratio. The asymmetric attachment is better illustrated in FIG. 9. Referring to FIG. 9, mirror plate comprises diagonals BB and CC. Deformable hinge is disposed with its length parallel to a diagonal (e.g. BB) of the mirror plate. However, the length of the deformable hinge is not along any diagonal of the mirror plate in the top view when the mirror plate is parallel to the light transmissive substrate. Of course, the mirror plate can be attached to the deformable hinge symmetrically by placing the attachment point around the geometric or mass center of the mirror plate, which will not be discussed in detail herein.

Similar to that in FIG. 6, the deformable hinge is preferably formed beneath the deflectable mirror plate in the direction of the incident light so as to avoid unexpected light scattering by the deformable hinge. For reducing unexpected light scattering of the mirror plate edge, the illumination light is preferably incident onto the mirror plate along a corner of the mirror plate.

Figure 10:
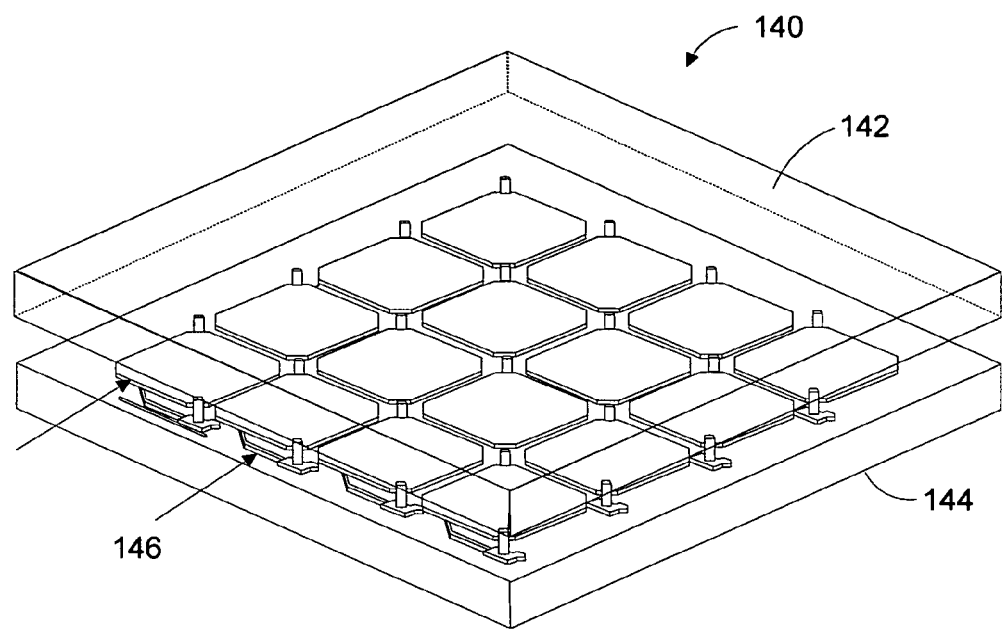
FIG. 10 is a perspective view of an exemplary spatial light modulator of FIG. 1.

Referring to FIG. 10, an exemplary spatial light modulator having an array of micromirrors of FIG. 8 is illustrated therein. For simplicity purposes, only 4×4 micromirrors are presented. In this example, micromirror array 148 is formed on light transmissive substrate 142; and addressing electrode and circuitry array 146 is formed on semiconductor substrate 144 for deflecting the micromirrors in the micromirror array. The deformable hinges of the micromirrors, as well as the addressing electrodes are hidden from the incident light.

Figure 11:
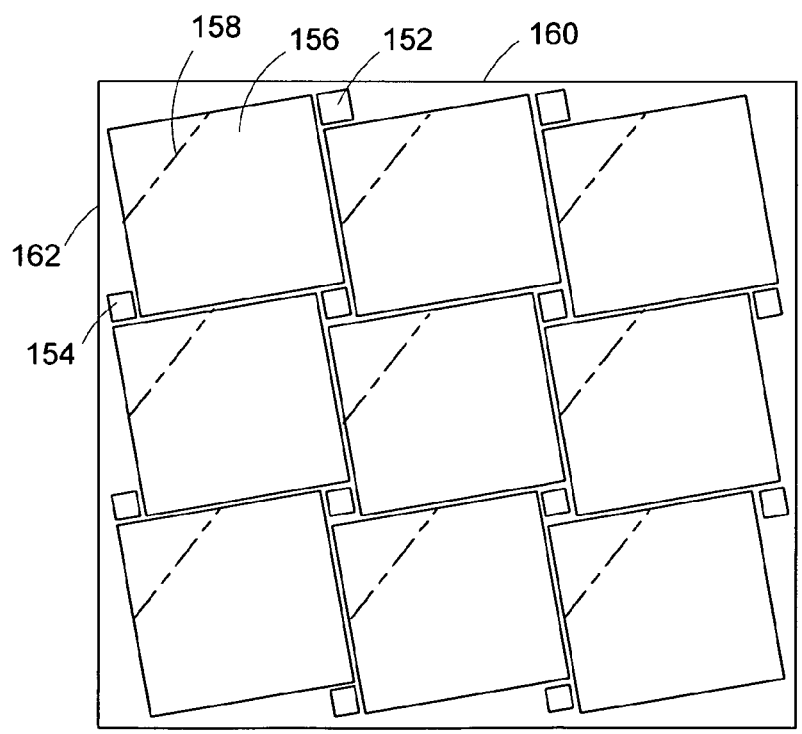
FIG. 11 is a top view of another exemplary spatial light modulator of FIG. 1.

The micromirrors in the micromirror array of the spatial light modulator can be arranged in alternative ways, another one of which is illustrated in FIG. 11. Referring to FIG. 11, each micromirror is rotated around its geometric center an angle less than 45° degrees. The posts (e.g. 152 and 154) of each micromirror (e.g. mirror 156) are then aligned to the opposite edges of the mirror plate. No edges of the mirror plate are parallel to an edge (e.g. edges 160 or 162) of the micromirror array. The rotation axis (e.g. axis 158) of each mirror plate is parallel to but offset from a diagonal of the mirror plate when viewed from the top of the mirror plate at a non-deflected state.

Figure 12:
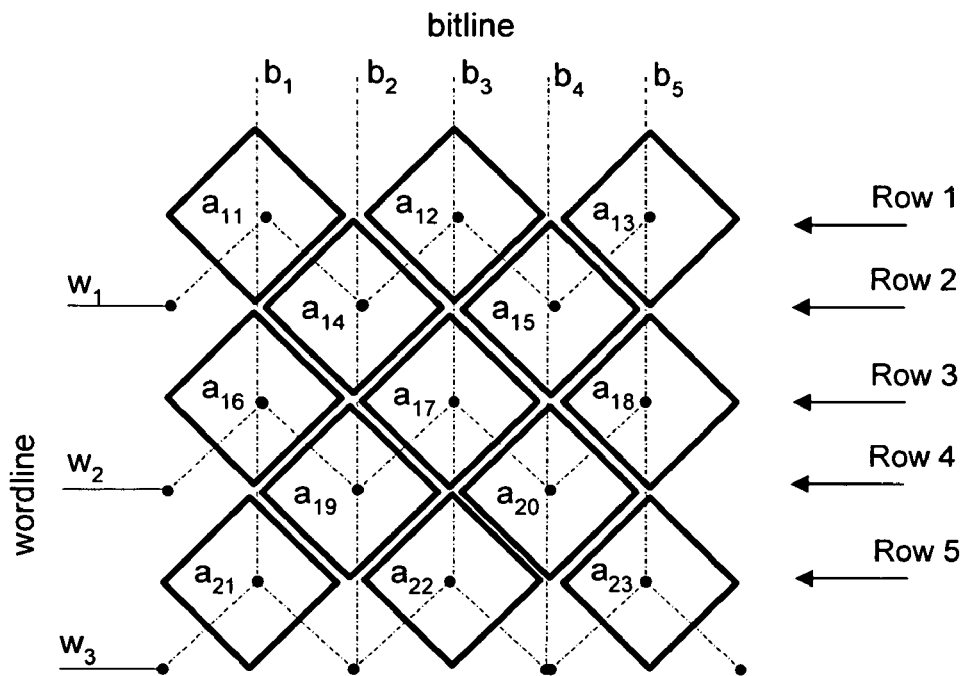
FIG. 12 schematically shows a top view of another exemplary micromirror array.

FIG. 12 illustrates the top view of another micromirror array having an array of micromirrors of FIG. 6. In this example, each micromirror is rotated 45° degrees around its geometric center. For addressing the micromirrors, the bitlines and wordlines are deployed in a way such that each column of the array is connected to a bitline but each wordline alternatively connects micromirrors of adjacent rows. For example, bitlines $b_1$, $b_2$, $b_3$, $b_4$, and $b_5$ respectively connect micromirrors groups of ($a_{11}$, $a_{16}$, and $a_{21}$), ($a_{14}$ and $a_{19}$), ($a_{12}$, $a_{17}$, and $a_{22}$), ($a_{15}$ and $a_{20}$), and ($a_{13}$, $a_{18}$, and $a_{23}$). Wordlines $w_1$, $w_2$, and $w_3$ respectively connect micromirror groups ($a_{11}$, $a_{14}$, $a_{12}$, $a_{15}$, and $a_{13}$), ($a_{16}$, $a_{19}$, $a_{17}$, $a_{20}$, and $a_{18}$), and ($a_{21}$, $a_{22}$, and $a_{23}$). With this configuration, the total number of wordlines is less the total number of bitlines.

Figure 13:
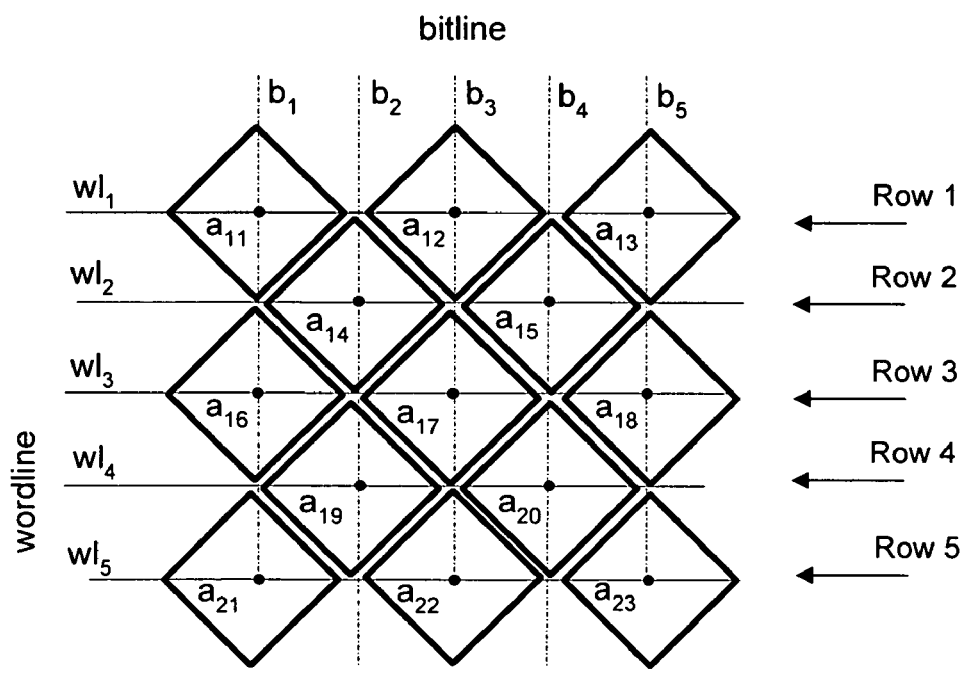
FIG. 13 schematically shows a top view of yet another exemplary micromirror array.

For the same micromirror array, the bitlines and wordlines can be deployed in other ways, such as that shown in FIG. 13. Referring to FIG. 13, each row of micromirrors is provided with one wordline and one bitline. Specifically, bitlines $b_1$, $b_2$, $b_3$, $b_4$ and $b_5$ respectively connect column 1 (comprising micromirrors $a_{11}$, $a_{16}$, and $a_{21}$), column 2 (comprising micromirrors $a_{14}$ and $a_{19}$), column 3 (comprising micromirrors $a_{12}$, $a_{17}$, and $a_{22}$), column 4 (comprising micromirrors $a_{15}$ and $a_{20}$), and column 5 (comprising micromirrors $a_{13}$, $a_{18}$, and $a_{23}$). Wordlines $WL_1$, $WL_2$, $WL_3$, $WL_4$, and $WL_5$ respectively connect row 1 (comprising micromirrors $a_{11}$, $a_{12}$, and $a_{13}$), row 2 (comprising micromirrors $a_{14}$ and $a_{15}$), row 3 (comprising micromirrors $a_{16}$, $a_{17}$, and $a_{18}$), row 4 (comprising micromirrors $a_{19}$ and $a_{20}$) and row 5 (comprising micromirrors $a_{21}$, $a_{22}$, and $a_{23}$).

Figure 14A:
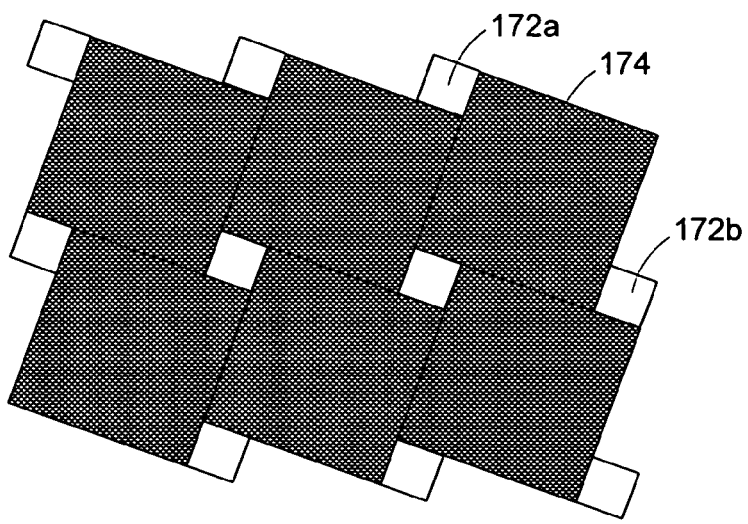
FIGS. 14a to 15 schematically show a top view of another exemplary micromirror array device comprising an array of electrodes and circuitry and micromirrors.
Figure 14B:
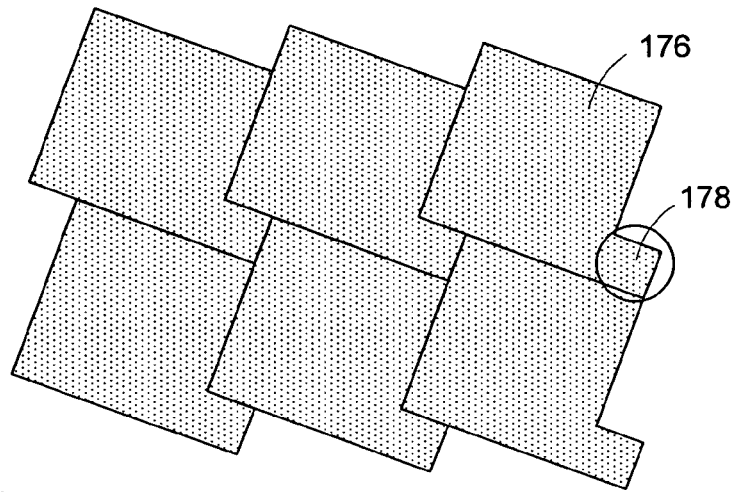
Figure 15:
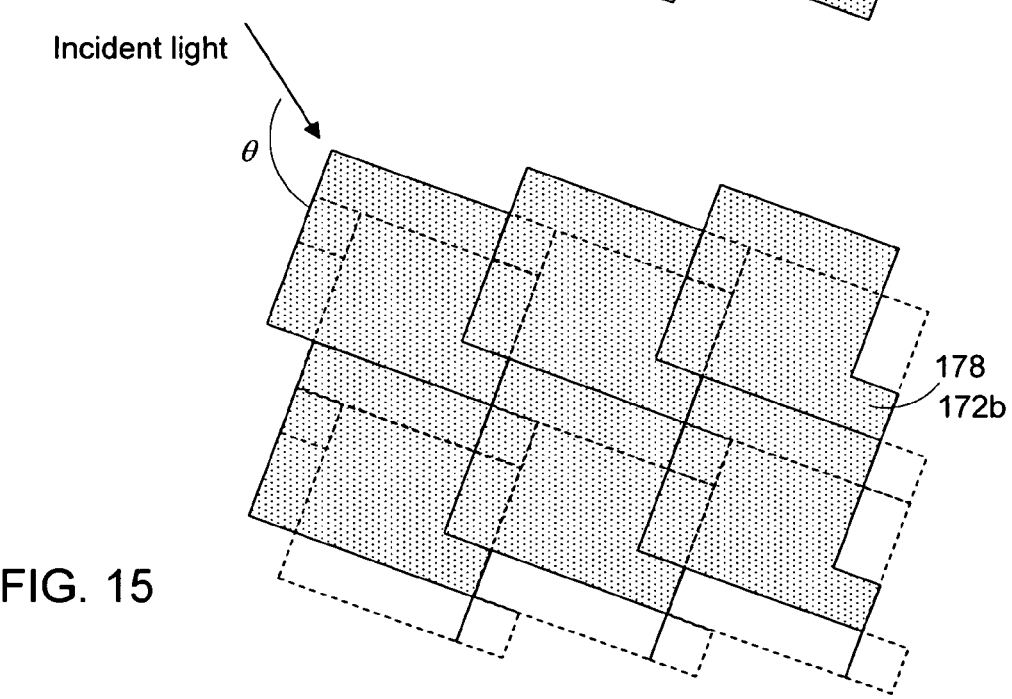

According to another embodiment of the invention, the mirror plates of the micromirrors in the array can form a plurality of pockets, in which posts can be formed, wherein the pockets are covered by the extended areas of the addressing electrodes when viewed from the top of the micromirror array device, as shown in FIGS. 14a to 15.

Referring to FIG. 14a, a portion of an array of mirror plates of the micromirrors is illustrated therein. The mirror plates in the array form a plurality of pockets in between. For example, pockets 172a and 172b are formed in which posts for supporting and holding mirror plate 174 can be formed. For individually addressing and deflecting the mirror plates in FIG. 14a, an array of addressing electrodes is provided, a portion of which is illustrated in FIG. 14b.

Referring to FIG. 14b, each addressing electrode has an extended portion, such as extended portion 178 of addressing electrode 176. Without the extended portion, the addressing electrode can be generally square, but having an area equal to or smaller than the mirror plate.

FIG. 15 illustrates a top view of a micromirror array device after the addressing electrodes in FIG. 14b and the mirror plates in FIG. 14a being assembled together. It can be seen in the figure that each addressing electrode is displaced a particular distance along a diagonal of the mirror plate associated with the addressing electrode. As a result, the pockets presented between the mirror plates are covered by the addressing electrode, specifically by the extended portions of the addressing electrodes. In this way, light scattering otherwise occurred in the substrate having the addressing electrodes can be removed. The quality, such as the contrast ratio of the displayed images can be improved.

When used in a spatial light modulator of a display system as shown in FIG. 2, the incident light beam is directed onto the mirror plates in a direction along the displacement direction of the addressing electrodes when viewed from the top of the addressing electrodes as shown in the figure. For example, the incident light has an angle θ to an edge of the addressing electrode (or the mirror plate) when viewed from the top; and the angle can be 135° degrees.

The micromirrors in which embodiments of the invention can be implemented may be composed of any suitable materials and fabricated in many ways. According to the invention, the deflectable mirror plate comprises reflective film, preferably composed of a metallic material (e.g. aluminum, gold, silver) having a high reflectivity, deposited on another non-metallic material, such as $SiO_x$, $SiN_x$ and $TiN_x$ for enhancing the mechanical properties of the mirror plate. Alternatively, other materials, such as a barrier layer for preventing diffusion between the metallic reflecting layer and the mechanical enhancing layer, can be deposited between the metallic reflecting layer and the mechanical enhancing layer.

The deformable hinge preferably comprises an electrically conductive layer. Examples of suitable materials for the hinge layer are Al, Ir, titanium, titanium nitride, titanium oxide(s), titanium carbide, $TiSiN_x$, $TaSiN_x$, or other ternary and higher compounds.

The microelectromechanical device of the present invention can be enclosed in a package. Specifically, the microelectromechanical device can be disposed on a package substrate. The package substrate can be of any suitable materials, such as ceramic. A package cover, such as a light transmissive plate (e.g. glass, quartz, and sapphire) can be bonded to the package so as to form a gap therebetween in which the micromirror array device can be disposed. The package cover can be a light transmissive plate (e.g. glass, quartz, and sapphire) or a plate having a light transmissive window through which the illumination light can pass.

The micromirror device may also comprise a getter or lubricant material. The getter and/or the lubricant material can be disposed on the substrate having the reflective deflectable mirror plate or the substrate having the addressing electrodes. Specifically, when the mirror plates are enclosed within a space between two substrates (e.g. a light transmissive substrate and semiconductor substrate), the getter and/or lubricant material can be disposed within the space between the two substrates. Alternatively, when the micromirror array device is disposed within a package, such as enclosed between a package substrate and package cover bonded to the package substrate, the getter and lubricant material can be disposed within the package, such as between the package substrate and package cover.

It will be appreciated by those skilled in the art that a new and useful microelectromechanical device having a movable element with low mass inertia have been described herein. In view of many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof. In the claims, only elements denoted by the words "means for" are intended to be interpreted as means plus function claims under 35 U.S.C. §112, the sixth paragraph.

We claim:

1. A microelectromechanical device, comprising:
a microelectromechanical deflectable element held on a substrate such that the microelectromechanical element is capable of moving relative to the substrate, and wherein the element has a mass inertia of $1.2 \times 10^{-24}$ kg·m$^2$ or less.

2. The device of claim 1, wherein the deflectable element is a deflectable mirror plate of a micromirror device.

3. The device of claim 2, wherein the micromirror device is a member of a micromirror array device comprising an array of micromirrors.

4. The device of claim 3, wherein the micromirror array device is a die on a wafer that comprises a plurality of micromirror dies, each comprising an array of micromirror devices.

5. The device of claim 4, wherein said wafer is assembled to another wafer comprising a plurality of electrode dies, each of which comprises an array of addressing electrodes, wherein each addressing electrode is associated with one of the mirror plate for deflecting and addressing said mirror plate.

6. The device of claim 3, wherein said micromirror device is disposed on a supporting surface of a package substrate.

7. The device of claim 6, further comprising: a light blocking mask for absorbing or blocking visible light.

8. The device of claim 3, further comprising: a getter disposed between the light transmissive substrate and semiconductor substrate.

9. A display system, comprising:
a light source providing an illumination light;
a spatial light modulator comprising an array of micromirror devices of claim 3 for modulating the illumination light; and
a projection lens for collecting and projecting the modulated illumination light onto a display target.

10. The device of claim 2, wherein the substrate is a light transmissive substrate.

11. The device of claim 10, wherein the mirror plate is associated with an addressing electrode for electrostatically deflecting the mirror plate; and wherein the addressing electrode is on a semiconductor substrate that is bonded to the light transmissive substrate.

12. The device of claim 11, further comprising: a getter disposed on the semiconductor substrate.

13. The device of claim 11, further comprising: a lubricant material disposed between the light transmissive substrate and semiconductor substrate.

14. The device of claim 2, wherein the substrate is a semiconductor substrate on which an addressing electrode is formed; and wherein said addressing electrode is associated with the mirror plate for deflecting the mirror plate.

15. The device of claim 2, wherein the mirror plate is deflectable with an electrostatic field formed by a proximate electrode.

16. The device of claim 2, wherein the mirror plate is capable of rotating from a natural resting state to an ON state angle and to an OFF state angle, wherein a difference between the ON and OFF state angles is 18° degrees or more.

17. The device of claim 2, wherein the mirror plate has a thickness of 8000 angstroms or less.

18. The device of claim 2, wherein the mirror plate has a thickness of 4000 angstroms or less.

19. The device of claim 18, wherein the difference between the ON and OFF state angles is 22° degrees or more.

20. The device of claim 2, wherein the mirror plate has a thickness of 2000 angstroms or less.

21. The device of claim 2, wherein the mirror plate is a multilayered structure comprising a reflective layer for reflecting an incident light.

22. The device of claim 2, wherein the mirror plate has an average mass density of 3500 kg·m$^{-3}$ or less.

23. The device of claim 2, wherein the mirror plate has an average mass density of 2200 kg·m$^{-3}$ or less.

24. The device of claim 1, wherein the mirror plate is attached to a deformable hinge.

25. The device of claim 24, wherein the mirror plate and deformable hinge are in the same plane when the mirror plate is not deflected.

26. The device of claim 24, wherein the mirror plate and deformable hinge are on separate planes that are spaced apart in a direction perpendicular to the mirror plate when the mirror plate is not deflected.

27. The device of claim 26, wherein the distance between the separate planes of the mirror plate and deformable hinge is 1 microns or less.

28. The device of claim 24, wherein the mirror plate is attached to the deformable hinge at an attachment, wherein the attachment point is not around the geometric center of the mirror plate.

29. The device of claim 24, wherein the mirror plate is attached to the deformable hinge at an attachment, wherein the attachment point is around the geometric center of the mirror plate.

30. The device of claim 1, wherein the inertia is from $0.2 \times 10^{-24}$ kg·m$^2$ to $1.2 \times 10^{-24}$ kg·m$^2$.

31. The device of claim 30, wherein the inertia is $1.0 \times 10^{-24}$ kg·m$^2$ or less.

32. The device of claim 30, wherein the inertia is $0.93 \times 10^{-24}$ kg·m$^2$ or less.

33. The device of claim 30, wherein the inertia is $0.77 \times 10^{-24}$ kg·m$^2$ or less.

34. The device of claim 1, wherein the deflectable element has an intrinsic resonant frequency of 50 KHz or higher.

35. A microelectromechanical device, comprising:
an array of deflectable microelectromechanical elements held on a substrate such that each of the microelectromechanical elements is capable of moving relative to the substrate, wherein a ratio of a mass inertia of one microelectromechanical deflectable element to a center-to-center distance between the microelectromechanical deflectable element and an adjacent microelectromechanical deflectable element is from $0.01 \times 10^{-18}$ kg·m to $0.12 \times 10^{-18}$ kg·m.

36. The device of claim 35, wherein the deflectable element is a deflectable mirror plate of a micromirror device.

37. The device of claim 36, wherein the mass inertia of said deflectable element is $1.2 \times 10^{-18}$ kg·m$^2$ or less.

38. The device of claim 37, wherein the mass inertia of said deflectable element is $1.1 \times 10^{-18}$ kg·m$^2$ or less.

39. The device of claim 38, wherein the mass inertia of said deflectable element is $1.0 \times 10^{-18}$ kg·m$^2$ or less.

40. The device of claim 38, wherein the mass inertia of said deflectable element is $0.9 \times 10^{-18}$ kg·m$^2$ or less.

41. The device of claim 38, wherein the substrate is a light transmissive substrate.

42. The device of claim 41, wherein the mirror plate is attached to a deformable hinge.

43. The device of claim 42, wherein the mirror plate and deformable hinge are on separate planes that are spaced apart in a direction perpendicular to the mirror plate when the mirror plate is not deflected.

44. The device of claim 43, wherein the mirror plate is attached to the deformable hinge at an attachment, wherein the attachment point is not around the geometric center of the mirror plate.

45. The device of claim 44, wherein the mirror plate is capable of rotating from a natural resting state to an ON state angle and to an OFF state angle, wherein a difference between the ON and OFF state angles is 18° degrees or more.

46. The device of claim 44, wherein the mirror plate has a thickness of 8000 angstroms or less.

47. The device of claim 46, wherein the mirror plate has an average mass density of 3500 kg·m$^{-3}$ or less.

48. The device of claim 47, wherein the mirror plate has an average mass density of 2200 kg·m$^{-3}$ or less.

49. The device of claim 36, wherein the substrate is a semiconductor substrate on which an addressing electrode is formed; and wherein said addressing electrode is associated with the mirror plate for deflecting the mirror plate.

50. The device of claim 36, wherein the ratio is from $0.03 \times 10^{-8}$ kg·m to $0.08 \times 10^{-18}$ kg·m.

51. A micromirror device, comprising:
a substrate;
a deformable hinge held on the substrate;
a deflectable mirror plate attached to the hinge at an attachment point that is offset from the mass center of the mirror plate such that the mirror plate is capable of rotating asymmetrically relative to the substrate; and
wherein the mirror plate has a mass inertia of $8 \times 10^{-24}$ kg·m$^2$ or less.

52. The device of claim 51, wherein the micromirror device is a spatial light modulator in a projection television.

53. The device of claim 52, wherein the substrate is a light transmissive substrate.

54. The device of claim 52, wherein the mirror plate and deformable hinge are on separate planes that are spaced apart in a direction perpendicular to the mirror plate when the mirror plate is not deflected.

55. The device of claim 54, wherein the inertia is from $0.2 \times 10^{-24}$ kg·m$^2$ to $8 \times 10^{-24}$ kg·m$^2$.

56. The device of claim 55, wherein the inertia is $1.0 \times 10^{-24}$ kg·m$^2$ or less.

57. The device of claim 55, wherein the inertia is $0.93 \times 10^{-24}$ kg·m$^2$ or less.

58. The device of claim 55, wherein the inertia is $0.77 \times 10^{-24}$ kg·m$^2$ or less.

59. The device of claim 54, wherein the mirror plate is capable of rotating from a natural resting state to an ON state angle and to an OFF state angle, wherein a difference between the ON and OFF state angles is 18° degrees or more.

60. The device of claim 59, wherein the difference between the ON and OFF state angles is 22° degrees or more.

61. The device of claim 51, wherein the substrate is a semiconductor substrate on which an addressing electrode is formed; and wherein said addressing electrode is associated with the mirror plate for deflecting the mirror plate.

62. The device of claim 51, wherein a ratio of the mass inertia to a center-to-center distance between two adjacent mirror plates is from $0.167 \times 10^{-18}$ kg·m to $1.25 \times 10^{-8}$ kg·m.

63. The device of claim 62, wherein a ratio of the mass inertia to a center-to-center distance between two adjacent mirror plates is from $0.0167 \times 10^{-8}$ kg·m to $0.12 \times 10^{-18}$ kg·m.

64. A microelectromechanical device, comprising:
a substrate;
a deformable hinge held on the substrate;
a microelectromechanical deflectable element attached to the hinge at an attachment point that is offset from the mass center of the mirror plate such that the microelectromechanical deflectable element is capable of rotating asymmetrically relative to the substrate; and
wherein a ratio of a mass inertia of the microelectromechanical deflectable element to a center-to-center distance between said microelectromechanical deflectable element and an adjacent microelectromechanical deflectable element is from $0.167 \times 10^{-18}$ kg·m to $0.7 \times 10^{-18}$ kg·m.

65. The device of claim 64, wherein the ratio is from $0.2 \times 10^{-18}$ kg·m to $0.5 \times 10^{-18}$ kg·m.

66. The device of claim 64, wherein the ratio is around $0.45 \times 10^{-18}$ kg·m.

67. The device of claim 64, wherein the substrate is a light transmissive substrate.

68. The device of claim 67, further comprising:
a semiconductor substrate having formed thereon an addressing electrode, said semiconductor substrate being disposed approximate to the mirror plate such that the mirror plate is capable of being deflected by an electrostatic filed between the mirror plate and addressing electrode.

69. The device of claim 64, wherein the substrate is a semiconductor substrate having formed thereon an addressing electrode associated with the mirror plate for electrostatically deflecting the mirror plate.

70. The device of claim 64, wherein the mass inertia is from $0.2 \times 10^{-24}$ kg·m$^2$ to $8 \times 10^{-24}$ kg·m$^2$.

71. The device of claim 64, wherein the mass inertia is $2 \times 10^{-24}$ kg·m$^2$ or less.

72. The device of claim 64, wherein the mass inertia is $1.2 \times 10^{-24}$ kg·m² or less.

73. The device of claim 64, wherein the mass inertia is $1.1 \times 10^{-24}$ kg·m² or less.

74. The device of claim 64, wherein the mass inertia is $0.9 \times 10^{-24}$ kg·m² or less.

75. The device of claim 64, wherein the center to center distance of the adjacent mirror plate is from 4 to 18 microns.

76. The device of claim 75, wherein the center to center distance of the adjacent mirror plate is from 4.38 to 10.16 microns.

* * * * *